United States Patent [19]

Wells

[11] 4,090,872

[45] May 23, 1978

[54] ALUMINUM BASE BRAZING ALLOY

[75] Inventor: Robert R. Wells, La Habra, Calif.

[73] Assignee: The United States of America as represented by the Secretary of the Air Force, Washington, D.C.

[21] Appl. No.: 756,041

[22] Filed: Dec. 29, 1976

[51] Int. Cl.² .................................................. C22C 21/12
[52] U.S. Cl. ..................................... 75/145; 75/134 C; 75/139
[58] Field of Search ................. 75/139, 162, 134 C, 75/145, 173 C; 148/32

[56] References Cited

U.S. PATENT DOCUMENTS

| | | | |
|---|---|---|---|
| 1,156,093 | 10/1915 | Pack | 75/139 |
| 1,352,322 | 9/1920 | Stay | 75/139 |
| 2,604,455 | 7/1952 | Reynolds et al. | 75/139 |

Primary Examiner—R. Dean
Attorney, Agent, or Firm—Joseph E. Rusz; William J. O'Brien

[57] ABSTRACT

An aluminum base, low-melting temperature alloy for joining together titanium surfaces. The alloy is fabricated from an admixture containing a major amount of aluminum in an amount in excess of about 41 weight percent and minor amounts of silver and copper.

3 Claims, 5 Drawing Figures

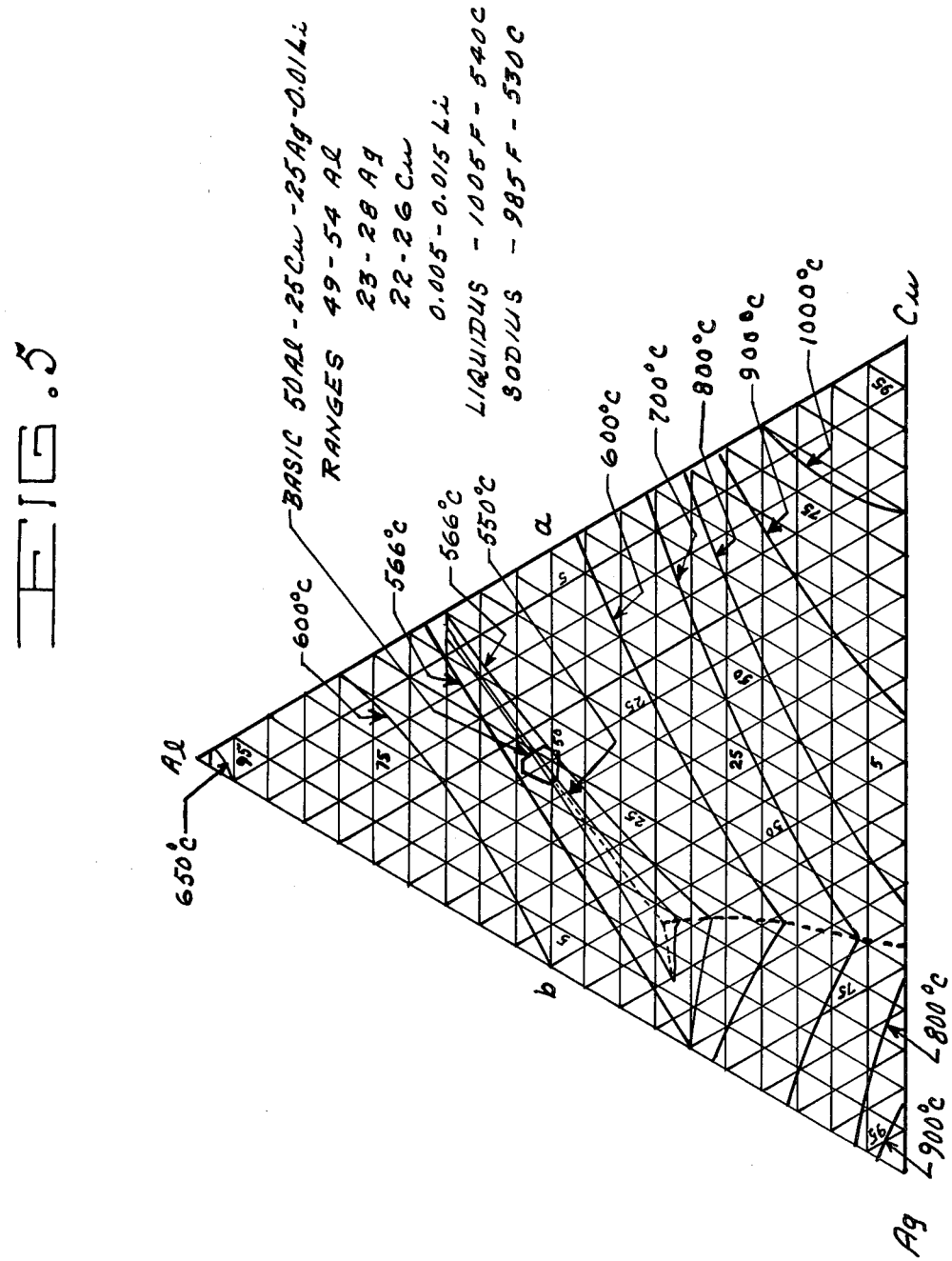

ALUMINUM BASE BRAZING ALLOY

STATEMENT OF GOVERNMENT INTEREST

The invention described herein may be manufactured and used by or for the Government for governmental purposes without the payment of any royalty thereon.

BACKGROUND OF THE INVENTION

This invention relates to aluminum alloys. More particularly, this invention relates to aluminum base, low-melting temperature alloys for utilization in joining titanium structural elements through a conventional brazing process.

The process of brazing is a type of welding technique used for joining together metal elements through the use of a nonferrous filler, or brazing material, which has a lower melting point than the metal elements being joined. The filler material, or brazing alloy, is distributed in its molten state between the adjoining surfaces of two metal members by capillary action. The selected brazing alloy must "wet" the abutting surfaces or in other words, adhere to the surfaces by alloying and diffusion. Generally, the melting point of the alloy is around 800° F or higher. The high melting point and great strength achieved in the brazing process differentiates it from soldering.

The brazing process varies widely in technique and is utilized in many industrial appllications for joining metal surfaces in the fabrication of structural elements. The recently increased research effort in the development of high speed and high altitude aircraft has produced greater interest in the use of brazing processes. Such aircraft encounter severe stresses and strains during operation resulting in the need for light weight construction materials of considerable strength. Sandwich type construction panels have proven extremely useful in providing the necessary high strength to low weight ratios needed for these high speed aircraft.

However, problems are often encountered when using titanium metal as the structural material for the sandwich type elements. The joining together of one titanium surface to another does not produce the high strength bond needed under severe conditions of stress and strain, especially at elevated temperatures. In attempting to solve the problem of joining titanium surfaces with a high strength bond, it has been found that an aluminum base brazing alloy of the type contemplated by this invention provides a solution by effectively joining the surfaces with a high strength bond without degrading the basic titanium metal due to the use of the high melting brazing alloys relied on in the past.

SUMMARY OF THE INVENTION

The present invention concerns itself with a low-melting temperature, aluminum base alloy for use in brazing titanium structures. The alloy is formulated from an admixture of controlled amounts of aluminum and copper as essential alloying ingredients. The invention also includes the use of silver and minor quantities of lithium, if desired, as additional alloying ingredients. The lithium is present in amounts up to about 0.1 weight percent. The alloying ingredients are present in amounts ranging from about 41 to 67 weight percent aluminum, 0 to 41 weight percent silver, 15 to 35 weight percent copper and 0.0 to 0.1 weight percent lithium.

Accordingly, the primary object of this invention is to provide an improved alloy for use in brazing and joining titanium metal members.

Another object of this invention is to provide an improved aluminum base brazing alloy containing at least 41 weight percent aluminum.

Still another object of this invention is to provide an improved, low-melting temperature brazing composition that yields a metallurgical bond possessing a high strength to low weight ratio at the elevated temperatures encountered during the operation of high speed and high altitude aircraft.

The above and still other objects and advantages of the present invention will become more apparent after consideration of the following detailed description thereof when taken in conjunction with the accompanying drawings.

BRIEF DESCRIPTION OF THE DRAWINGS

In the drawings:

FIGS. 2, 3, 4 and 5 are graphical illustrations showing the liquidus and solidus of the specific alloys contemplated by this invention.

DESCRIPTION OF THE PREFERRED EMBODIMENTS

Pursuant to the above-defined objects, the present invention concerns itself with aluminum base alloys for use in brazing titanium structures. The alloys are formulated from an admixture containing at least 41 weight percent aluminum together with copper as an essential ingredient and silver and lithium as optional ingredients. The lithium, if desired, is added in only small quantities up to about 0.1 weight percent, whereas the silver may be added in quantities up to about 41 weight percent.

Figure 1:
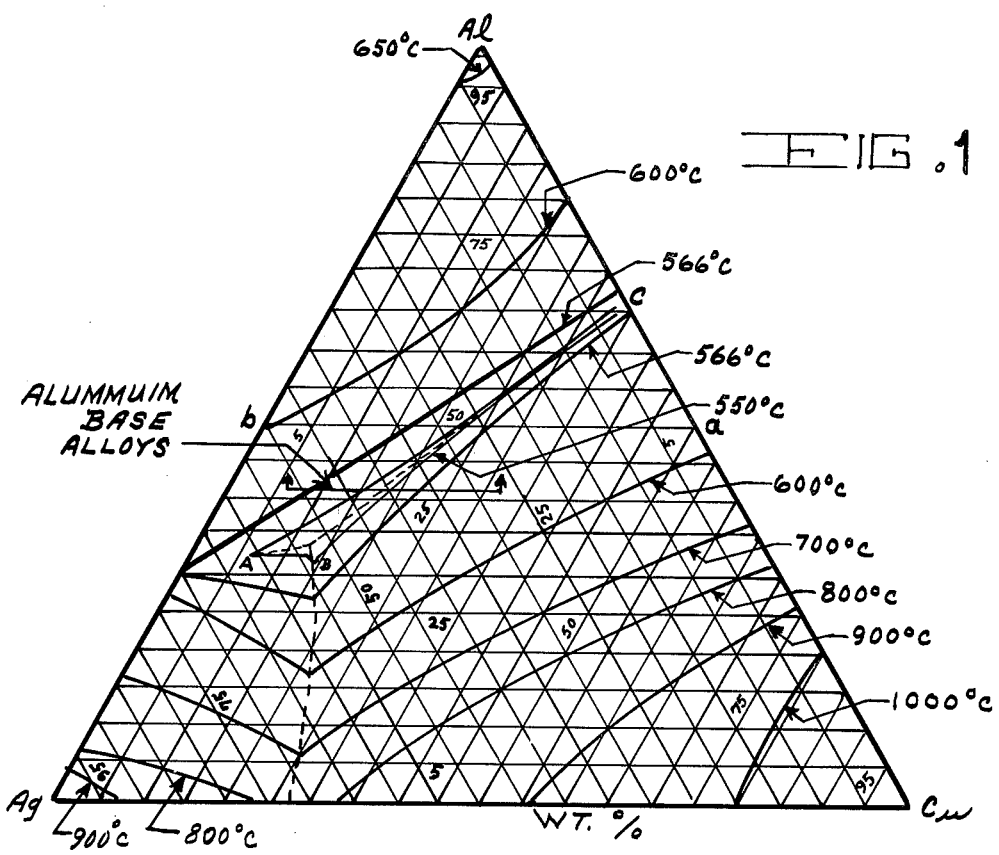
FIG. 1 is a graphical illustration showing the liquidus of an aluminum-silver-copper alloy system.
Figure 4:
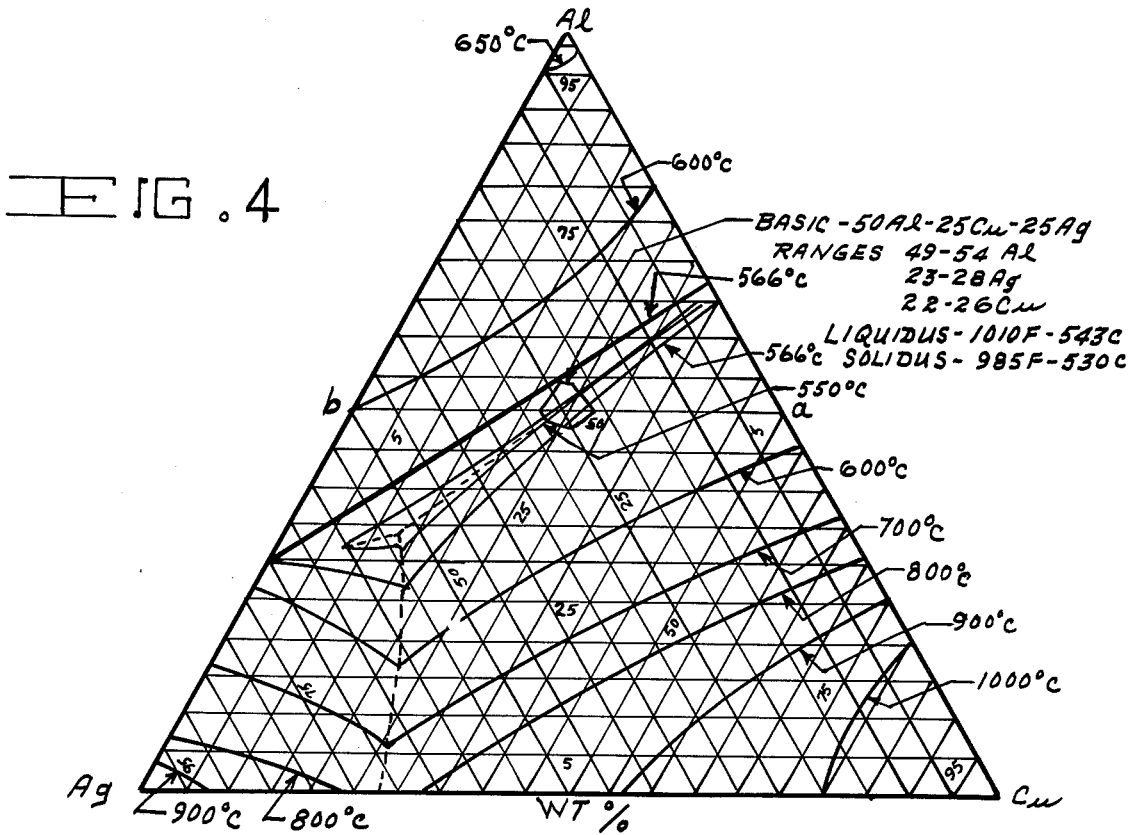
Figure 2:
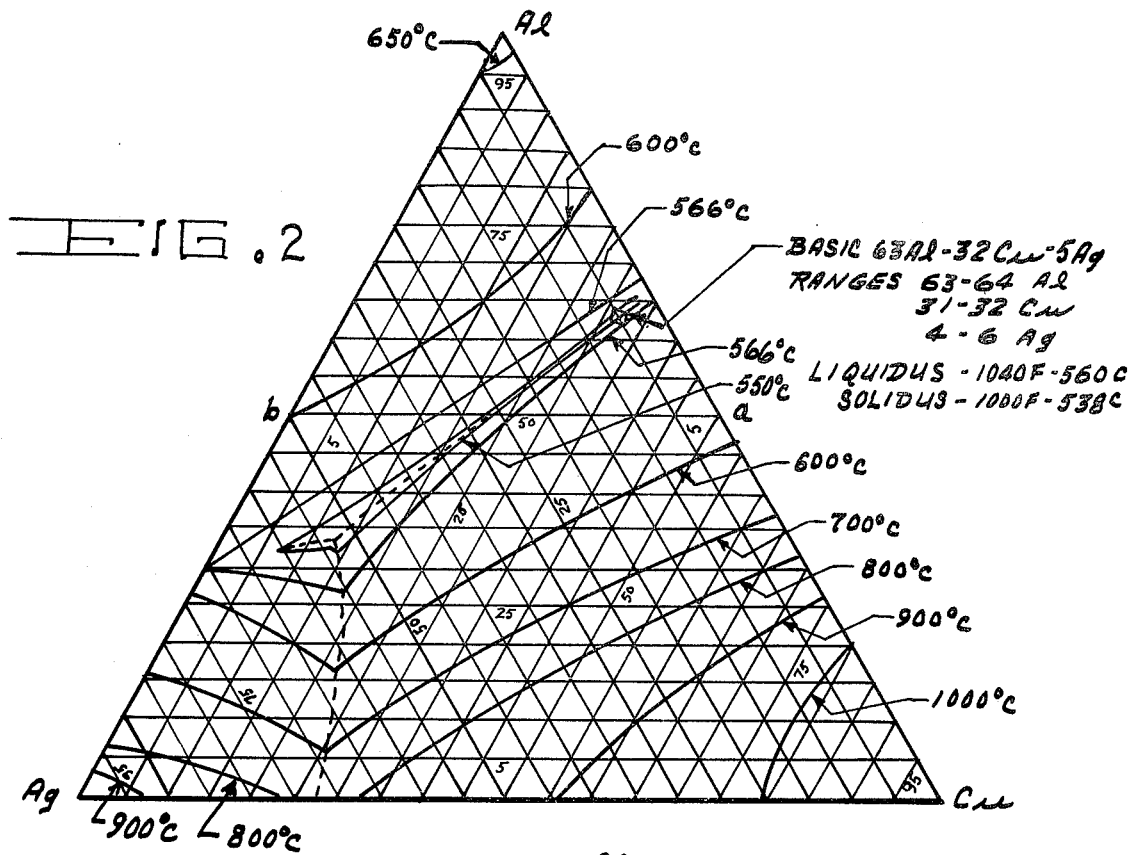
Figure 3:
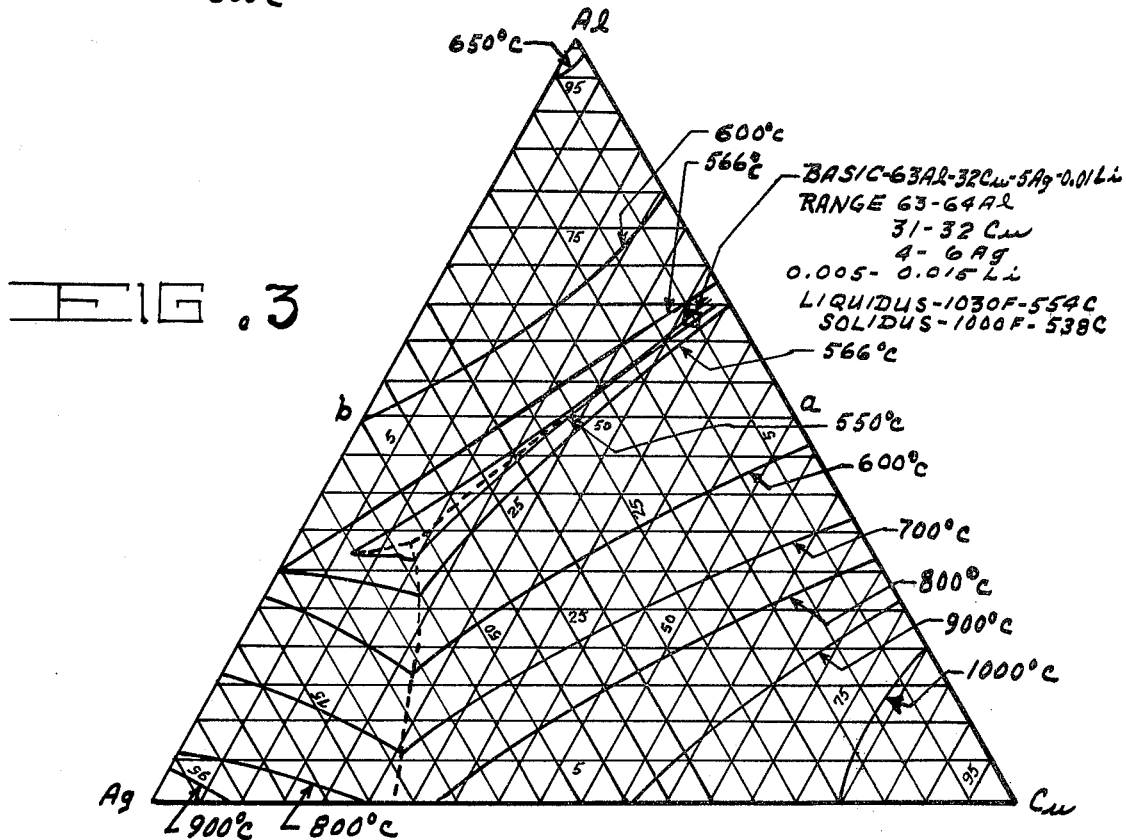

The ternary alloy system of aluminum, copper and silver is characterized by a eutectic liquid valley with low melting temperatures. The eutectic valley is illustrated by referring to FIG. 1 at points A, B, and C. This valley offers a range of composition for low temperature brazing applications which find special utility in joining together titanium metal surfaces. Compositions along the line between 57 Ag-33 Al-10 Cu and 65 Al-33 Cu-2 Ag will melt at temperatures below 1040° F (560° C).

The particular aluminum alloy compositions which have been evaluated and found to be effective in achieving high strength metallic bonds contain the following elements within the weight percentage ranges set forth in Table I.

TABLE I

| Element | Percent |
|---------|---------|
| Copper | 13 – 34 |
| Silver | 0 – 41 |
| Lithium | 0 – 0.1 |
| Aluminum | Balance |

As can be seen from Table I, the present invention contemplates the addition of small quantities of lithium to improve wetting and flow on titanium. It was found that 0.01 weight percent lithium was adequate for improving the wetting and flow of these alloys on titanium. Additional quantities of lithium up to about 0.1 weight percent produced small improvements, but at the expense of joint ductility.

Examples 1 through 4 which follow disclose preferred alloy compositions within the ranges stated in Table I and have the following approximate analysis.

EXAMPLE 1

| Element | Percent |
|---|---|
| Aluminum | 63 |
| Copper | 32 |
| Silver | 5 |

EXAMPLE 2

| Element | Percent |
|---|---|
| Aluminum | 63 |
| Copper | 32 |
| Silver | 5 |
| Lithium | 0.01 |

EXAMPLE 3

| Element | Percent |
|---|---|
| Aluminum | 50 |
| Copper | 25 |
| Silver | 25 |

EXAMPLE 4

| Element | Percent |
|---|---|
| Aluminum | 50 |
| Copper | 25 |
| Silver | 25 |
| Lithium | 0.01 |

The liquidus-solidus relationship for the specific alloys of Examples 1, 2, 3 and 4 are shown respectively in FIGS. 2, 3, 4 and 5 of the drawings. The specific liquidus and solidus temperature for each alloy are shown in their respective drawings, together with an indication of their compositional range.

Unless otherwise indicated, the term percent, as used in the instant specification and appended claims, refers to percent by weight based on the total alloy weight.

Although the present invention has been described with reference to preferred embodiments, those skilled in the art will readily understand that various modifications and alterations thereof may be resorted to without departing from the spirit of the invention, and that all such modifications as fall within the scope of the appended claims are intended to be included herein.

What is claimed is: pg,8

1. An Aluminum base alloy consisting essentially of the following composition:

|   | Percent |
|---|---|
| copper | 32 |
| silver | 5 |
| aluminum | 63 |

2. An aluminum base alloy consisting essentially of the following composition:

|   | Percent |
|---|---|
| copper | 25 |
| silver | 25 |
| aluminum | balance |

3. An aluminum base alloy in accordance with claim 2 and further including the addition of 0.01 percent lithium.

* * * * *